Jan. 4, 1927.
H. MICHEL
1,613,283
ROTARY ENGINE
Filed Oct. 26, 1922     2 Sheets-Sheet 1
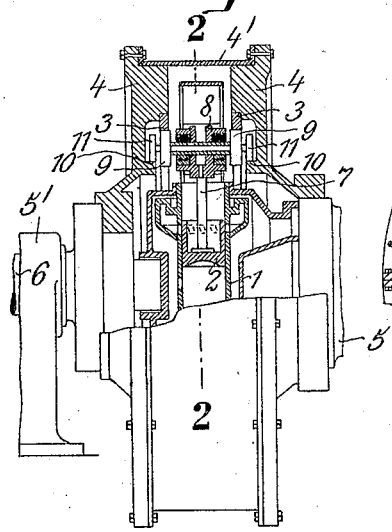
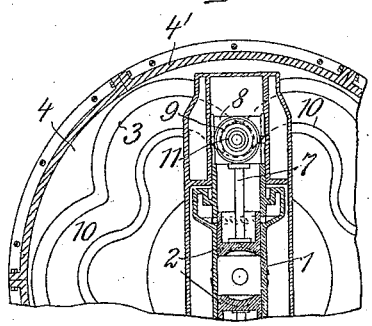
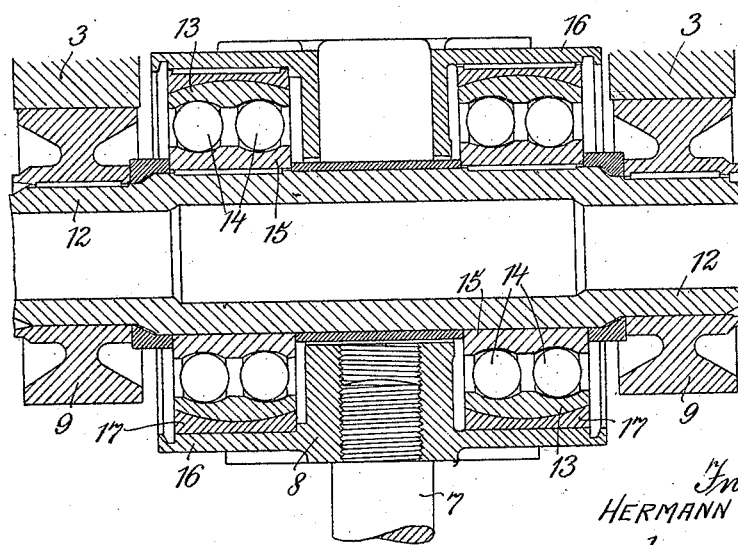
Inventor:
HERMANN MICHEL
by
Lotka, Kehlenbeck & Mathé
Attorneys

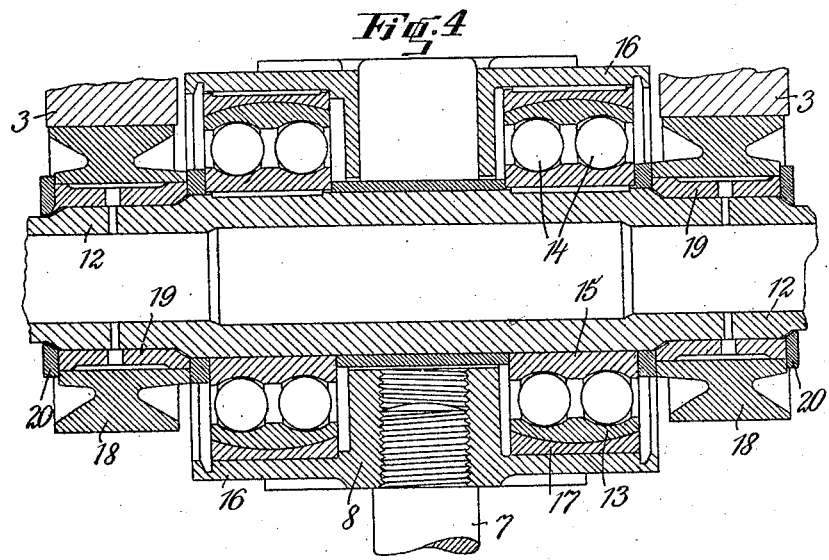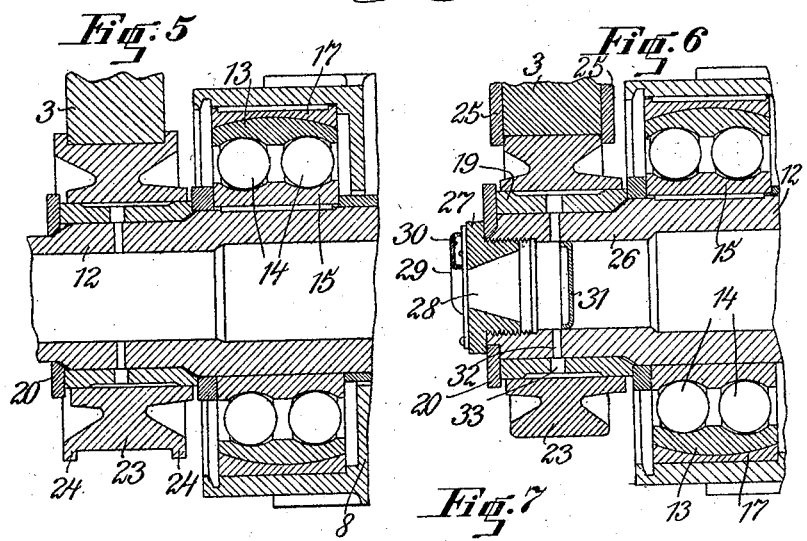

Patented Jan. 4, 1927.

1,613,283

UNITED STATES PATENT OFFICE.

HERMANN MICHEL, OF HOLSTEIN, GERMANY, ASSIGNOR TO CENTRA HANDELS- & INDUSTRIE A.-G., OF CHUR, SWITZERLAND, A CORPORATION OF SWITZERLAND.

ROTARY ENGINE.

Application filed October 26, 1922, Serial No. 596,975, and in Germany November 19, 1921.

My invention relates to improvements in rotary engines particularly of the type in which the reciprocating movement of one or more pistons or plungers is controlled by a cam member. In engines of this type the pistons or plungers carry cross-heads having rollers mounted thereon, which rollers are in engagement with the cam member or members, and which are ordinarily mounted on antifriction bearings. In constructions of this class such as are now in use the rollers are directly supported on the antifriction bearings, and I have found that in such constructions only the balls or rollers of the anti-friction bearing which are next to the cam face are operative to take up the pressure acting on the rollers.

One of the objects of the invention is to provide a bearing in which this objection is removed, and with this object in view I provide the roller with a shaft projecting laterally therefrom, and I mount the laterally projecting portions of the shaft on the cross-head through the intermediary of anti-friction bearings. Thereby I am enabled to support the anti-friction bearings in such a way that a comparatively large number of the balls thereof are adapted to take up the pressure. Furthermore, by thus constructing the anti-friction bearing the dimension thereof is independent of the diameter of the roller, so that it can be adapted to the form of the cam way.

Another object of the invention is to provide a construction in which, notwithstanding the irregular velocity of the rollers riding on the cam way, the balls of the anti-friction bearing rotate substantially at uniform velocity and with this object in view I mount the rollers so as to be rotatable on their axes. Thereby the wear of the anti-friction bearing is reduced. To guard the anti-friction bearing as against axial pressure I mount the rollers for axial movement along their axes.

In order that my invention be more clearly understood several examples embodying the same have been shown in the accompanying drawings in which the same reference characters have been used in all the views to indicate corresponding parts. In said drawings, Fig. 1, is an elevation partly in section showing an internal combustion engine and the improved roller bearing, Fig. 2, is a cross-section taken on the line 2—2 of Fig. 1, Fig. 3, is a longitudinal section on an enlarged scale showing the rollers and their bearings, Fig. 4, is a similar section showing a modification, Figs. 5 and 6, are partial sections showing further modifications of the rollers and their bearings, and Fig. 7, is an end view showing a detail used in the construction illustrated in Fig. 6.

In the internal combustion engine illustrated in Figs. 1 and 2 within a stationary cylinder 1 two pistons 2 are mounted for reciprocating in opposite directions, the movement of said pistons being controlled by two cam ways 3 of similar configuration. The said cam ways are formed on or secured to rotary disks or fly wheels 4 provided one at each side of the cylinder 1. The said disks are connected by a ring 4' providing an oil proof casing enclosing the movable parts of the engine. One of the disks 4 is rotatably mounted on a bearing member 5, and the other one is secured to a shaft 6 mounted in a bearing member 5'. Power is transmitted from the pistons 2 to the cam members 3 by means of piston rods 7 and cross-heads 8 carrying rollers 9 for reducing friction and bearing on the cam ways 3. In addition to the cam members 3 subsidiary or inner cam members 10 and rollers 11 are provided which are adapted to hold the pistons 2 in position, particularly when the engine is at rest.

As appears more particularly from Fig. 3 the rollers 9 are secured to the ends of a tubular shaft 12 mounted in the cross-head 8 and on anti-friction bearings 13, 14, 15 disposed in bushings 17 fitted in laterally projecting flanges 16 of the cross-head and formed with spherical inner bearing surfaces. The flanges 16 are thin as compared to their length so that they have a certain elasticity as against the pressure of the pistons. The bushings 17 are rigidly secured to the cross-head and the inner race ring 15 is rigidly secured to the shaft 12.

If the anti-friction bearings 13, 14, 15 were disposed within the roller 9, the pressure exerted thereon by the pistons 2 or the cam way 3 would be transmitted to the race ring 15 only through those balls 14 which are in the positions in which the pressure acts on the balls. This would cause an objectionable strain on the said balls, because the whole pressure would be taken up only by the said balls and at the most by the balls directly adjacent thereto, while all the other balls would not take part in the transmission of the pressure. Therefore, it would be necessary to provide anti-friction bearings of a size sufficient to enable a small number of balls to take up the whole pressure, so that anti-friction bearings of large size and weight would be necessary.

By disposing the anti-friction bearings 13, 14, 15 laterally of the rollers 9 the transmission of pressure through the balls can be made as desired. By elastically mounting the anti-friction bearings I am enabled to distribute the transmission of the pressure to insure uniform transmission of the pressure over one half of the circumference of the outer race ring 13 located in the direction of the pressure, so that nearly one half of the balls 14 of the bearings transmit the pressure. Therefore a bearing of small size and weight may be used. In the example shown in Fig. 3 such satisfactory transmission of the pressure is insured by mounting the anti-friction bearings within flanges 16 having thin walls and yielding as against pressure so as to distribute the pressure by their elasticity over one half of the balls 14.

Furthermore, the diameter of the rollers 9 can be such that the best cooperation with the cam ways 3 is insured, because it is not necessary in designing the rollers to pay attention to the size of the anti-friction bearing.

As the parts of the cam ways 3 are different distances away from the center of rotation of the rotary bodies 4, their velocity and therefore the circumferential velocity of the rollers 9 are different, and the rollers are alternately accelerated and retarded, according as they move towards the outer or inner parts of the guide ways. In the construction shown in Fig. 3 the rollers are secured to the shaft 12, to rotate in unison therewith, so that such acceleration and retardation is transmitted to the inner race way 15, the balls 14, and the spacing disks thereof. As is known in the art, a variation of the circumferential velocity of anti-friction bearings is objectionable, because thereby the balls and race rings are subject to rapid wear.

Therefore in the modifications shown in Fig. 4 this objection is nearly removed by loosely mounting the rollers 18 on their shaft 12 or a sleeve 19 secured thereto, longitudinal displacement of the rollers being prevented by disks 20 secured to the shaft. As the friction of the rollers on their bearing surfaces is larger than that of the anti-friction bearings the shaft 12 is made to rotate. If, however, the rollers 18 are accelerated or retarded by running on the cam ways 3, the friction on the bearing surfaces is not sufficient directly to transmit the accelerating or retarding forces to the anti-friction bearing. As upon each rotation of the rotary members 4 the velocity of the rollers is varied several times, the shaft 12 and the inner race ring 15 and the balls 14 assume a median velocity, so that the wear of the anti-friction bearing is reduced.

In the constructions shown in Figs. 1 to 4 cam ways 3 are provided at both sides of the cross-head 8. Therefore by inaccuracy in constructing or assembling the engine the said guide ways may in some cases be slightly offset or out of registry with relation to each other in circumferential direction. In such cases the shaft 12 will tend to take a position oblique to the vertical plane passing through the axis of the piston rod, because it always tends to bear on both guide ways. Thereby the cross-head will be turned on the piston rod 7. When the shaft 12 takes such oblique position axial forces are exerted on the roller, and such axial forces are transmitted to the shaft 12 and the anti-friction bearing 13, 14, 15, if the connection between the roller and the axis is such as to prevent axial displacement, as has been described with reference to Figs. 3 and 4. As is known in the art anti-friction bearings are particularly sensitive as against axial forces.

For this reason, I prevent axial pressure by mounting the rollers 23 so as to be longitudinally shiftable on the shaft 12 or the sleeve 19, and I provide said rollers with flanges 24 engaging at both sides of the guide ways 3, as is shown in Fig. 5.

If now the shaft 12 should assume an oblique position the rollers 23 are shifted on the sleeves 19 in axial direction by the axial pressure acting thereon, so that no axial pressure is transmitted from the rollers to the shaft 12 and the anti-friction bearings 13, 14, 15. The flanges 24 prevent the rollers from be shifted so far that they do not bear any more with their whole breadth on the cam ways 3. It will be understood that my invention is not limited to the construction shown herein in which the flanges 24 are provided on the rollers, and that similar flanges 25 may be provided on the guide members, as is shown in Fig. 6. These flanges may be secured rigidly to the guide members, or made integral therewith.

Where the rollers are loosely mounted on the shaft 12 I provide for automatic lubrication of the bearing surfaces. In constructions of the type shown in Figs. 1 and 2 the cross-heads are movable in a closed casing filled with oil in the form of a spray, in which case lubrication is effected by means of collecting members connected with the shaft 12. In the example shown in Figs. 6 and 7 the tubular shaft 12 is closed at its ends 26 by a nut 27 provided with a central opening 28 flaring outwardly and toward the inner part of the shaft. To the outer face of the nut 27 a spiral case 29 is secured which opens at its inner part into the opening 28 and is formed with an inlet 30 in the form of a bucket. At a suitable distance away from the nut 27 a partition 31 is fitted within the tubular shaft 12 so as to provide therein a chamber, from which the lubricant is passed through radial bores 32 and 33 made in the wall of the tubular shaft 12 and the bushing 19 respectively and to the bearing surface of the roller 23.

By the inlet or bucket 30 the lubricant distributed within the casing 4, 4' is collected and passed to the opening 28 and the chamber provided within the shaft 12. Within the said chamber the lubricant rotates with the shaft and it is thrown by centrifugal action through the bores 32, 33 and between the bearing surfaces. Thereby reliable lubrication of the roller is insured.

I claim:

1. In a machine of the class described, the combination, with a cylinder, and a piston reciprocating therein, of a cam member cooperating with said piston for controlling the reciprocating movement thereof, a roller connected with said piston and in position for riding on said cam member, and an elastically mounted anti-friction bearing between said piston and roller located at the side of the roller.

2. In a machine of the class described, the combination, with a cylinder, and a piston reciprocating therein, of a cam member cooperating with said piston for controlling the reciprocating movement thereof, an elastic casing connected with said piston and located laterally of said cam member, an anti-friction bearing within said casing, a roller supported by said bearing and disposed laterally thereof and in position for riding on said cam member.

3. In a machine of the class described, the combination with a cylinder, a piston reciprocating therein, a rotary member having offset cam members cooperating with said piston for controlling the reciprocating movement thereof, of a guide member having laterally offset bearing supports, means connecting said piston to said guide member between said supports, anti-friction bearings in said offset bearing supports, and a shaft mounted in said bearings and carrying rollers in position to engage said offset cam members.

4. In a machine of the class described, the combination, with a cylinder, and a piston reciprocating therein, of a pair of spaced cam members cooperating with said piston for controlling the reciprocating movement thereof, an anti-friction bearing connected with said piston, a shaft rotatable in said anti-friction bearing, and rollers axially shiftable on said shaft and located in positions for riding on said cam members.

5. In a machine of the class described, the combination, with a cylinder, and a piston reciprocating therein, of a pair of spaced cam members cooperating with said piston for controlling the reciprocating movement thereof, an anti-friction bearing connected with said piston, a shaft rotatable in said anti-friction bearing, rollers axially shiftable on said shaft and located in positions for riding on said cam members, and means to prevent relative displacement of the rollers and cam members axially of the rollers.

6. In a machine of the class described, the combination, with a cylinder, and a piston reciprocating therein, of a pair of spaced cam members cooperating with said piston for controlling the reciprocating movement thereof, an anti-friction bearing connected with said piston, a shaft rotatable in said anti-friction bearing, and rollers axially shiftable on said shaft and located in positions for riding on said cam members, said rollers being formed with flanges straddling said cam members.

7. In a machine of the class described, the combination, with a cylinder, and a piston reciprocating therein, of a cam member cooperating with said piston for controlling the reciprocating movement thereof, an anti-friction bearing connected with said piston, a shaft rotatable in said anti-friction bearing, a roller rotatable on said shaft and located in position for riding on said cam member, and means provided on said shaft and constructed to collect lubricant and to supply the same to the bearing surface of said roller on the shaft.

8. In a machine of the class described, the combination, with a cylinder, and a piston reciprocating therein, of a cam member cooperating with said piston for controlling the reciprocating movement thereof, an anti-friction bearing connected with said piston, a shaft rotatable in said anti-friction bearing, a roller rotatable on said shaft and located in position for riding on said cam member, and means in the form of a spiral bucket having an eccentric inlet provided on said shaft and constructed to collect lubricant and to supply the same to the bearing surface of said roller on the shaft.

In testimony whereof I hereunto affix my signature.

HERMANN MICHEL.